June 24, 1924.

W. H. POWELL 1,499,076

DYNAMO ELECTRIC MACHINE AND WINDING THEREFOR

Filed March 27, 1919  5 Sheets-Sheet 1

Inventor
W. H. Powell
by
Attorney

June 24, 1924.

W. H. POWELL 1,499,076

DYNAMO ELECTRIC MACHINE AND WINDING THEREFOR

Filed March 27, 1919      5 Sheets-Sheet 5

Inventor
W. H. Powell
by
Attorney

Patented June 24, 1924.

1,499,076

UNITED STATES PATENT OFFICE.

WILLIAM H. POWELL, OF MILWAUKEE, WISCONSIN, ASSIGNOR TO ALLIS-CHALMERS MANUFACTURING COMPANY, OF MILWAUKEE, WISCONSIN, A CORPORATION OF DELAWARE.

DYNAMO-ELECTRIC MACHINE AND WINDING THEREFOR.

Application filed March 27, 1919. Serial No. 286,161.

*To all whom it may concern:*

Be it known that WILLIAM H. POWELL, a citizen of the United States of America, residing at Milwaukee, in the county of Milwaukee and State of Wisconsin, has invented a certain new and useful Improvement in Dynamo-Electric Machines and Windings Therefor, of which the following is a specification.

This invention relates to dynamo-electric machines and the windings therefor and may be applied in windings of the type known as multiplex by which term is understood such windings as comprise a plurality of independent or simplex windings.

Windings of the multiplex type become desirable under various conditions. If, for example, the current in any circuit of an ordinary simplex winding would become too large in a machine of given capacity, a multiple or multiplex winding may be resorted to, thus splitting any given circuit into a plurality of circuits, dependent upon the degree of multiplicity of the winding. Again, commutation may be improved by such a winding and thus the limit of capacity raised, inasmuch as the voltage between adjacent commutator segments is reduced, as may be also the number of series connected conductors, or, the number of series conductors may remain the same, the number of commutator segments being increased, thus splitting up the voltage according to the number of windings. These and other conditions may be met with some success by ordinary multiplex windings.

Serious difficulties may however be encounted in the practical use of such a winding owing to various inequalities, such as in field strength of the poles of a multipolar machine, or of resistance of the various circuits of the windings, or of eccentricity of the armature and field, and other causes, singly or collectively, unequal potentials will be induced in the active conductors of the winding, or currents of unequal value will flow in the various circuits thereof, resulting in sparking and flashing at the commutator and undue heating of the coils.

It has been proposed to use connections between points in any given one of the multiple windings, theoretically at the same potential, and in addition connecting together a number of adjacent conductors, as for example, in Arnold's work entitled "Die Gleichstrom Maschine", second edition, published by Julius Springer, Berlin, 1906, Vol. I, page 177, Fig. 167. Compensation by the latter scheme is however only partial and raises the potential difference between certain commutator segments. It has also been proposed to connect a point in a back connector of a coil of one winding of a duplex winding to a front terminal of an adjacent coil in another winding. This is obviously open to the objection that the connectors must pass from one end of the armature to the other. In certain types of windings such a connection would, moreover, involve connection to a coil at a point lying within a slot, that is, a point on a portion of an active conductor, which is cumbersome.

One of the objects of this invention is to provide a winding which will obviate and eliminate the hereinbefore mentioned and other difficulties, will improve the commutation and heating characteristics of machines of hitherto feasible capacity, and will make possible the construction of machines of still larger capacity, having good commutation and heating characteristics.

One of the more specific objects of this invention is the provision of a winding of any degree of multiplicity in which equipotential points will occur in the respective components of said winding, and more particularly, so that these points will occur at the same end of the respective windings.

Other objects will appear hereinafter as the description of the invention proceeds.

The novel features of the invention will appear from the specification and the accompanying drawings which form a part thereof and disclose several embodiments of said invention and all these novel features are intended to be particularly pointed out in the claims.

In Fig. 1 the invention is diagrammatically shown as it may be applied in a triplex winding.

In Figs. 2 and 3 the invention is shown as it may be applied in a duplex and quadruplex winding respectively.

Figure 1:
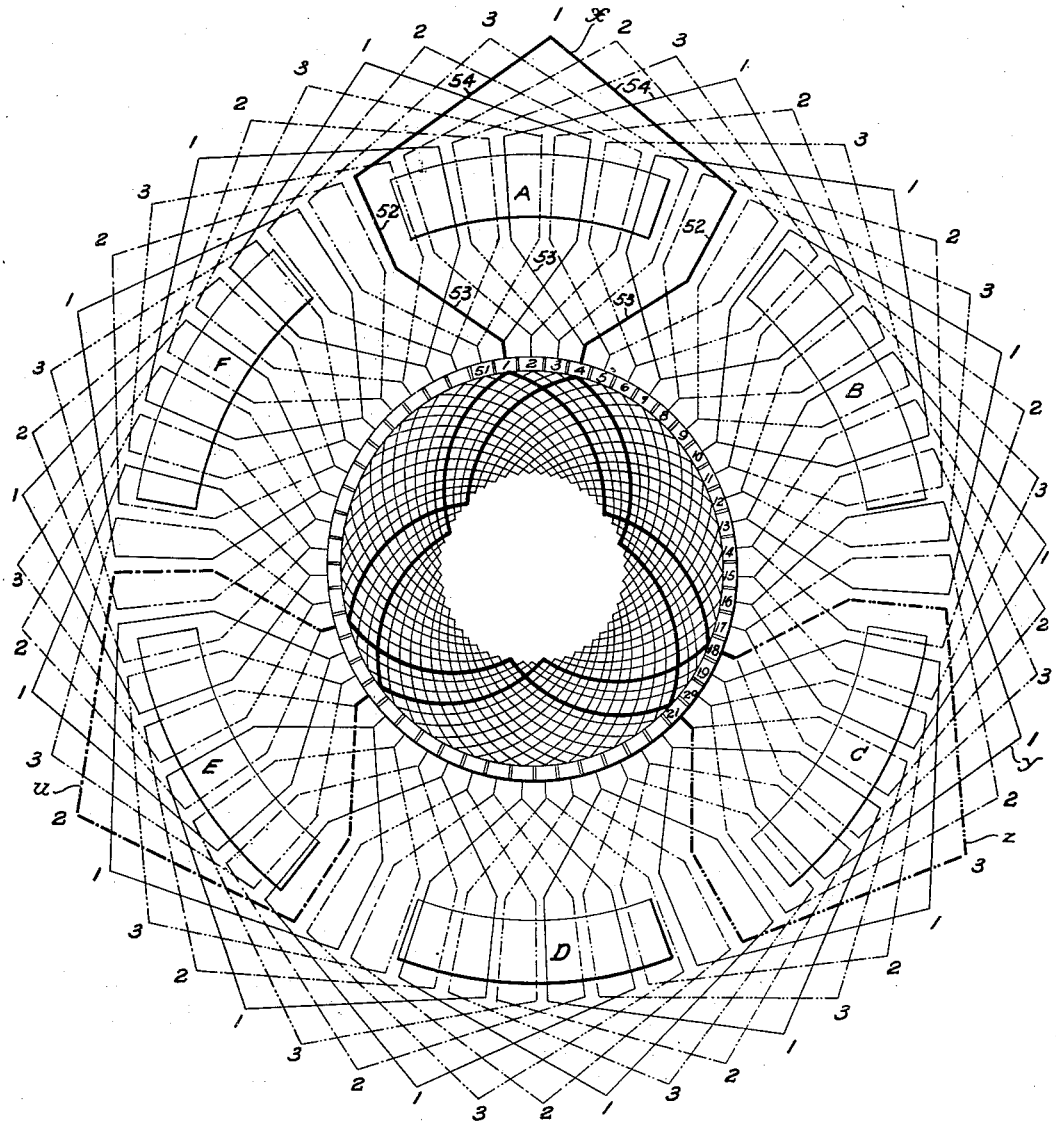

Referring now to Fig. 1, the particular embodiment of the invention here shown is a triplex winding developed as a polar diagram. The winding is here shown as of the lap type having active conductors 52 connected by front and back connectors 53, 54 respectively. At the tip of each back connector, the winding elements or coils have been numbered in repeating numerical series 1, 2, 3,—1, 2, 3, etc. The winding, in this instance, has a total of 51 winding elements or coils and the same number of commutator segments, but it is of course to be understood that these numbers are arbitrarily chosen and are limited only as hereinafter to be specifically pointed out. Each of the simplex windings comprising the multiplex winding can be further identified throughout the winding inasmuch as the windings indicated as Nos. 1, 2, 3 are drawn respectively in full, dot and dash, and two dots and dash lines.

The winding is adapted to cooperate with the diagrammatically indicated polar zones A, B, C, D, E, F. These zones alternate in magnetic polarity in the usual manner.

If any given winding such as No. 1 be traced, as in a clockwise direction, from the coil $x$ (drawn in full heavy lines), the coil $y$ will be reached after, in this instance, 5 laps. It will be observed that coil $y$ does not occupy the same position with respect to the polar zone C as coil $x$ does to zone A located almost 360 electrical degrees therefrom. In fact there are no coils in winding 1 located, at any given instant, 360 electrical degrees from the coil $x$ and situated similarly with respect to the polar zones. It is therefore apparent that no equipotential points exist 360 electrical degrees apart, in any one winding. It will however be noted that coil $z$ of winding 3 and coil $x$ of winding 1 are located symmetrically with respect to polar zones C and A respectively. It follows that the terminals of coil $z$ or the commutator segments to which it is connected, will correspond in potential to those of coil $x$ and its commutator segments and these points may therefore be connected by equipotential connections. The coil $u$, 360 electrical degrees from coil $z$ is situated, as is evident, with respect to polar zone E the same as coils $x$ and $z$ with respect to zones A and C. Equipotential connections are therefore also possible from coil $z$ to coil $u$ and from coil $u$ to coil $x$. The equipotential connections therefore become reentrant. Thus, as we pass along the equipotential connections from coil $x$ in a clockwise direction we touch a coil in winding 3, a coil in winding 2, back to a coil in winding 1. If the number of poles were 12 instead of 6 as in Fig. 1, the cycle just noted would, if the pitch were the same, be repeated before reentrancy was obtained. In the triplex winding the number of poles is therefore preferably divisible by 6.

The coils $u$, $x$, $z$ and the two sets of equipotential connections connecting their terminals have been shown in heavier lines than the remaining coils, which more clearly brings out the connections and relations, but it is of course obvious that these coils differ in no respect from any of the other sets of coils similarly connected. All of the commutator segments have been shown as provided with equipotential connections but it will be plain to those skilled in the art that if desired a less number may be so connected. Furthermore, the pitch of the equipotential connections may be any multiple of 360 electrical degrees, that is, 360°×1 or 360°×2 or 360°×3, and so forth, which will depend on the degree of accuracy of equalization desired and the number of available poles.

Considering the manner in which the simplex windings are distributed around the periphery, it will be observed that, what may be termed the field displacement between any two adjacent winding elements or coils, is so chosen that the summation of displacements between polar zones of similar sign may be regarded as less than, greater than or, in any event, unequal to 360 electrical degrees, so that a winding element in a simplex winding different from that of an element in a polar zone 360 electrical degrees distant will assume a symmetrical position with respect to its polar zone at any given instant. In spite of this inequality, the total summation of field displacements of any given simplex winding must be equal to the product of the number of pairs of poles times 360 electrical degrees, or double or more than that amount, if it is desired that the winding itself shall be more than singly re-entrant. It may therefore be stated in general that the winding is so imbricated that the active conductors of one winding are adapted to pass a given polar zone while active conductors of another winding are passing a similar polar zone so that equipotential points will exist in different windings. This will in itself, other things being equal, greatly improve commutation and make possible machines of larger capacity by tending to split up the potential between commutator segments 1 and 4 of Fig. 1, for example, into three substantially equal parts. By tying together the equipotential points, or a number thereof, any remaining inequalities may be compensated for.

The conditions above pointed out may be obtained by observing the proper determining factors in selecting the number of poles, winding elements, windings, etc. A consideration of these determining factors may be obtained as follows:

If the total number of winding elements or coils is designated by C, the number of pairs of poles, by $p$, and the number of windings by $m$ the following relation may be deduced from Fig. 1. The number of winding elements or coils per pair of poles, $\frac{C}{p}$, and also, the number of the former per simplex winding, $\frac{C}{m}$ should preferably be an integer but, $$\frac{\frac{C}{p}}{m}$$

must not be an integer.

That is, the number of winding elements or coils per pair of poles is not divisible by the number of windings. This quotient may be expressed as follows:

$$\frac{\frac{C}{p}}{m}=a+\frac{b}{m}.$$

Referring to Fig. 1 it will be noted that the integer $b$ in the above formula represents the number of winding positions or, in other words, numbers in the repeating numerical series, that coil $y$ falls short of assuming the position of coil $z$. Integer $b$ may be any number less than $m$. Specifically, in Fig. 1, $$\frac{\frac{C=51}{p=3}}{m=3}=a+\frac{b}{m}=5+\frac{2}{3}$$

In this case $b=2$ which agrees with Fig. 1.

In the instance of Fig. 1 the pitch of the equipotential connections is $$\frac{C}{p}=ma+b$$

and a winding or connecting table may be prepared from the following general formulæ

1—$(ma+b)$+1—2 $(ma+b)$+1—3 $(ma+b)$+1.

2—$(ma+b)$+2—2 $(ma+b)$+2—3 $(ma+b)$+2.

3—$(ma+b)$+3—2 $(ma+b)$+3—3 $(ma+b)$+3.

4—etc.

As referred to hereinbefore, if the machine has a greater number of poles the general formula may be, if desired:

1—2$(ma+b)$+1—4$(ma+b)$+1—6$(ma+b)$+1 and so on.

Figure 2:
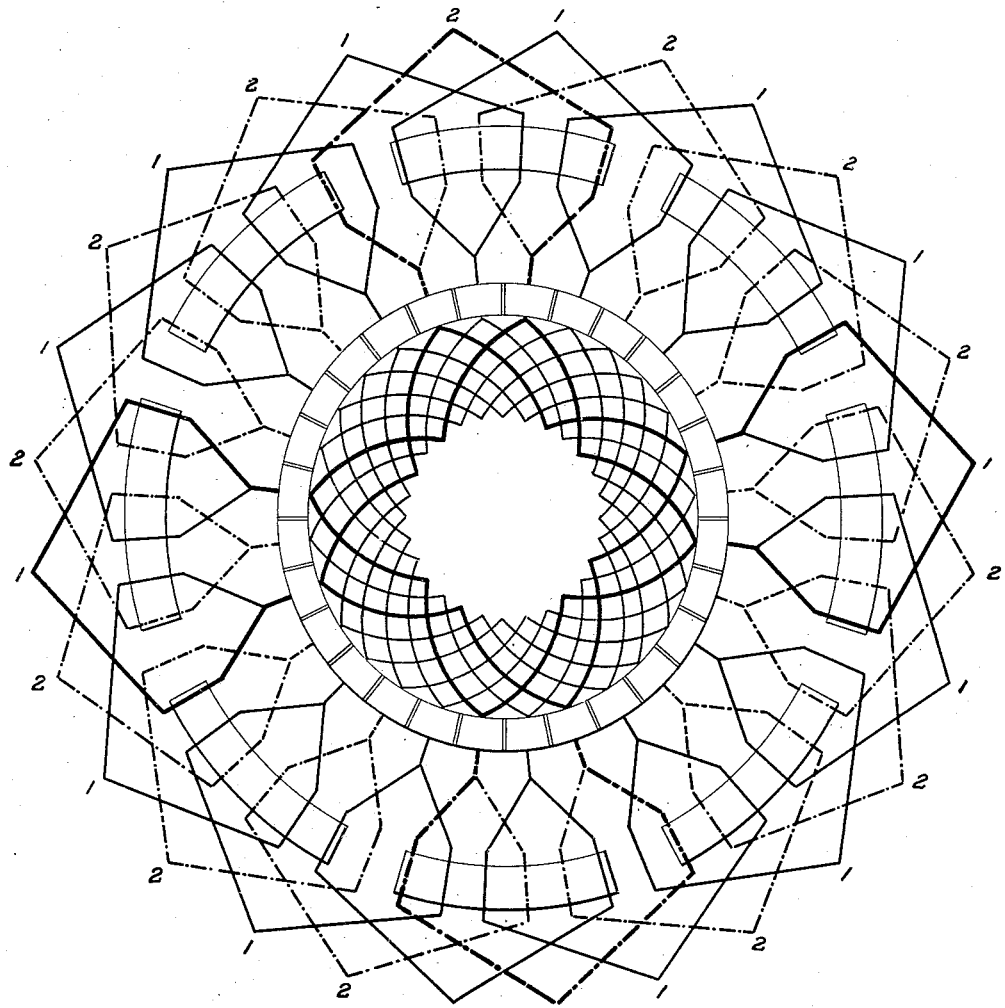
Figure 3:
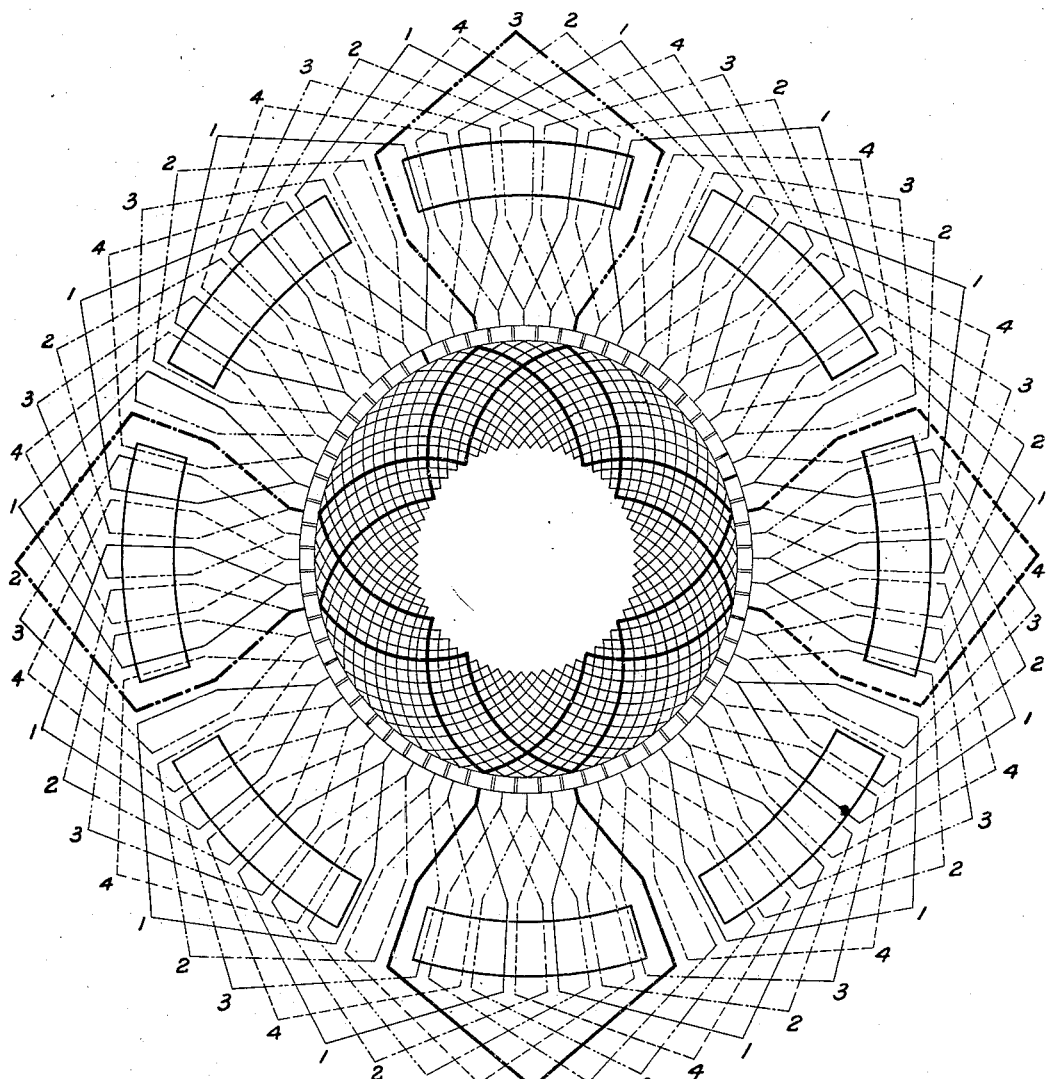

The condition, $$\frac{\frac{C}{p}}{m}=a+\frac{b}{m}$$

applies equally well to cases where $m$ is any other number than 3, and two additional cases have been illustrated, Fig. 2, showing an eight-pole duplex and, Fig. 3, an eight-pole quadruplex winding. The various windings and relations may be followed with ease by the distinguishing lines and numbering similar to Fig. 1 and further explanation in view thereof is deemed unnecessary.

Specifically, in Fig. 2

$$C=28$$
$$\frac{\frac{p=4}{m=2}}{}=a+\frac{b}{m}=3+\frac{1}{2}.$$

In this case $b$ equals 1.

In Fig. 3, $$C=60$$
$$\frac{\frac{p=4}{m=4}}{}=a+\frac{b}{m}=3+\frac{3}{4}.$$

A general expression may be obtained for the proper number of winding elements or coils per simplex winding, irrespective of the number of poles, as follows:

$$\frac{\frac{C}{p}}{m}=\frac{\frac{me}{md}}{m}=\frac{\frac{e}{d}=\text{an integer}}{m},$$

which must not be an integer. Here $e$ equals the number of winding elements or coils per simplex winding, and $d$ equals any whole number. That $p=md$ follows from the fact that the total number of poles ($2p$) should be equal to $2md$, inasmuch as there must be at least $2m=4$ poles for a duplex winding, $2m=6$ poles for a triplex, and so on.

Figure 4:
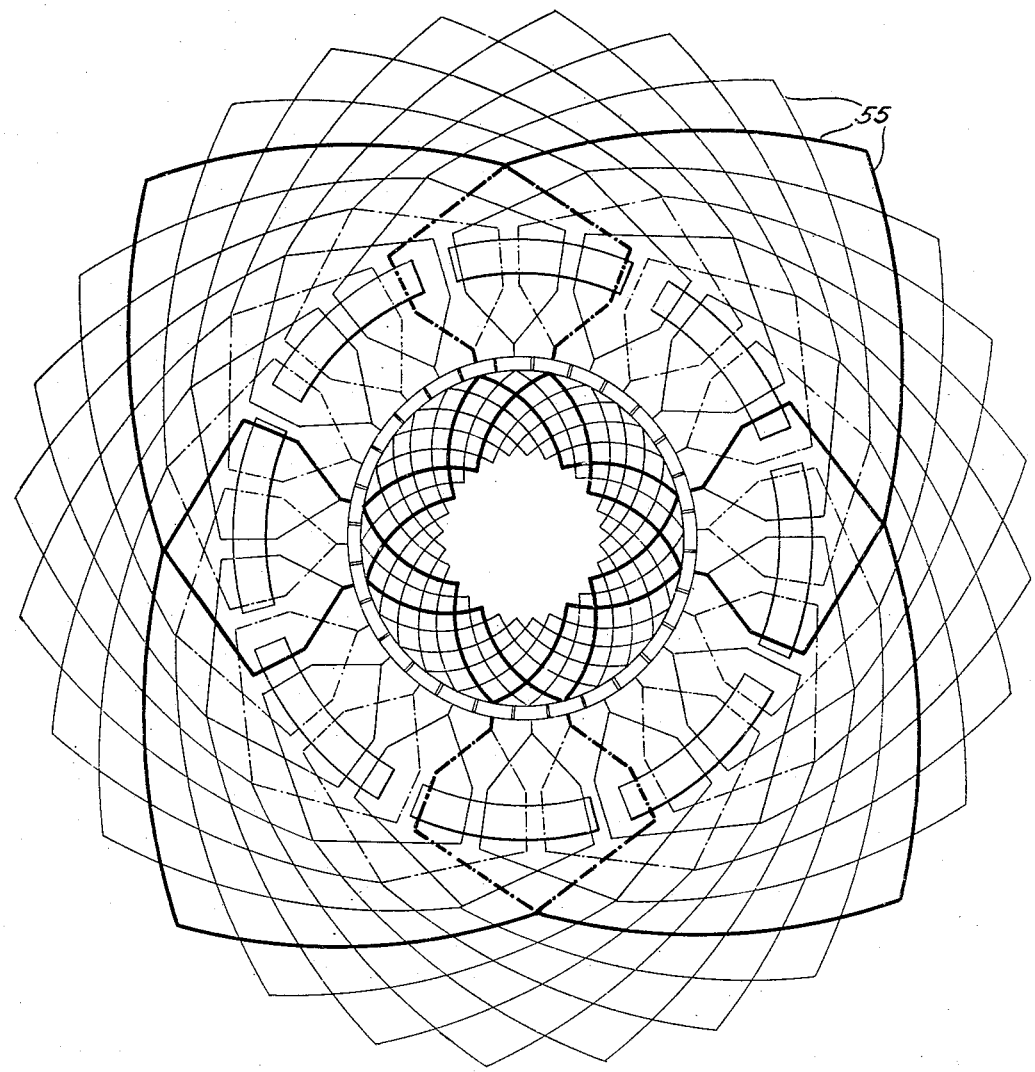
Fig. 4 shows a modified way in which the equipotental connections may be made.

It will be apparent to those skilled in the art that inasmuch as the equipotential points are disposed entirely at one end of a given winding that the connectors may be placed at the back end of the armature as well as at the commutator end, such back-equipotential-connectors, 55, being shown in Fig. 4. Or if desired, such connections may be made at both ends of the armature, as has been illustrated in Fig. 4. Here again it is apparent that while an equipotential connection has been shown for each winding element to a similarly located winding element, a lesser number may be used if desired. It will be furthermore obvious to those skilled in the art that the equipotential connections need not be disposed at the exact points shown but may be made anywhere along the back or front connectors or the commutator segment risers, for example.

The winding elements or coils may obviously be placed in slots in the armature and if this is done the number of slots should be governed in a manner similar to the number of winding elements; that is, the number of slots per pair of poles should be an integer not divisible by the number of windings.

If the number of slots is made the same as the number of winding elements and as a winding element in large machines usually consists of but two conductors, i. e., two half-coils, each slot will contain two half-coils which may be placed on top of each other. It is to be observed however that if the number of winding elements or double half-coils per slot is to be larger than one, the number must be so chosen as to be prime to the number of windings. For example, for a duplex winding the number of winding elements per slot should be 1, 3, 5, 7, etc.; for a triplex winding the number should be 1, 2, 4, 5, 7, etc.

Figure 5:
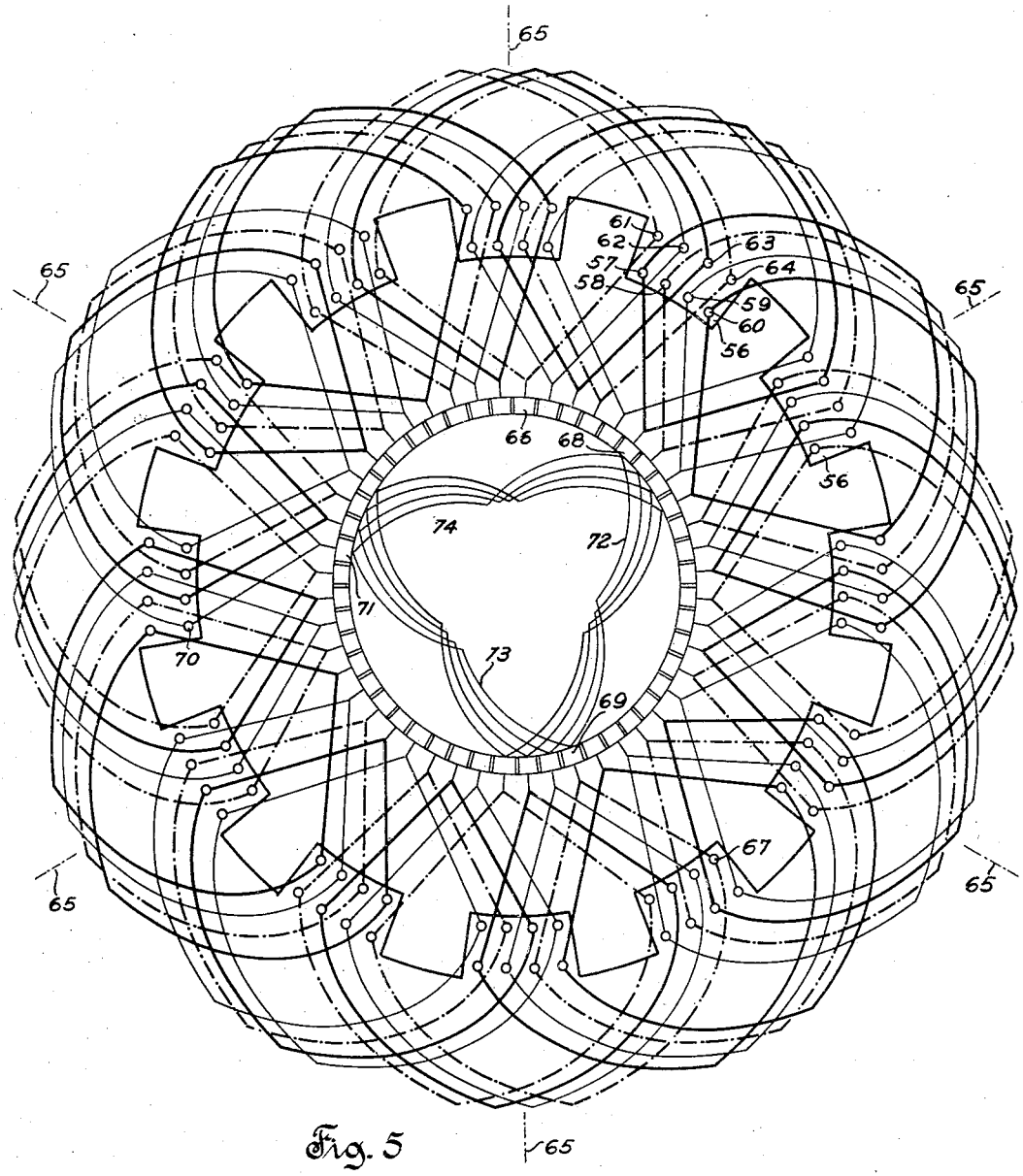
Fig. 5 shows one of many ways in which the invention may be applied when the winding elements or coils are located in slots on the armature, the winding here shown being of triplex form.

One example of a winding in which the winding elements or coils are placed in slots on the armature is shown diagrammatically in Fig. 5. The armature has slots 56, here shown as 12 in number. Each armature slot contains four winding elements comprising one-half of one set including conductors 57, 58, 59, 60 and one-half of another set including conductors 61, 62, 63, 64. The winding is of triplex form and the independent windings are indicated by heavy full, dot and dash and light full lines respectively. The winding is wound for six poles which are merely indicated by the dot and dash lines 65. The commutator has segments 66, 48 in number. The commutator segments (or other points on the winding, as, for example, the back connectors, as shown in Fig. 4,) may be connected by equipotential connections. Thus it will be seen that, by reason of the relationship between the number of poles, slots, and coils per slot, which relationship is in accordance with the conditions hereinbefore laid down, equipotential points will occur in conductors of different windings. Taking for example conductor 57 in the heavy full line winding; it will be seen that conductor 67 in the dot and dash winding being in the same position in its slot and in the same relation to the nearest pole or poles, is exactly 360 electrical degrees removed from conductor 57 and at the same potential; commutator segment 68 may therefore be connected, as by conductor 72, with segment 69. Conductor 70 in the light full line winding is also at the same potential, and segment 71 may therefore be connected to segments 69 and 68 as by connectors 73, 74 respectively. Only four of the re-entrant sets of equipotential connectors are shown, but there may be any desired number at desired intervals, the connectors of course always bridging points 360 electrical degrees (or some multiple thereof) from each other.

It should be understood that it is not desired that the invention claimed be limited to the exact details of construction herein shown and described, for obvious modifications may occur to persons skilled in the art.

It is claimed and desired to secure by Letters Patent:

1. A multiplex lap winding for dynamo-electric machines having a plurality of polar zones, comprising a plurality of imbricated independent windings the active conductors of one winding being arranged so that they are adapted to pass a given polar zone while active conductors of another winding are passing a similar polar zone and one or more equalizing connections between conductors of one winding and conductors of another winding.

2. In combination, a slotted armature for dynamo electric machines, a multiplex lap winding having winding elements in said slots and having points of equal potential in different windings, the number of winding elements per slot being prime to the number of windings, and one or more equalizing connections between points of equal potential in different windings.

3. In combination, a slotted armature for dynamo-electric machines, a multiplex lap winding in said slots, the ratio of the number of slots to the number of pairs of poles being an integer not divisible by the number of windings and one or more equalizing connections between the windings.

4. A multiplex lap winding for dynamo-electric machines in which the ratio of the number of winding elements to the number of pairs of poles is an integer not divisible by the number of windings and one or more equalizing connections between the windings.

5. In combination, a multiplex lap winding, having m windings, for dynamo-electric machines of the type having a commutator and means for preventing the potential difference between adjacent commutator segments from rising substantially above one m-th of the normal potential difference between every m-th segment during operation of the machine, comprising electrical connections between the windings, any given one of which is disposed entirely at one end of the winding.

6. In combination, a multiplex lap winding for dynamo-electric machines of the type having a commutator and means for equalizing the currents in the components of said winding including one or more electrical connections between segments 360 electrical degrees apart.

7. In a dynamo electric machine having a rotor and a commutator, means, including a multiplex winding having m windings disposed on said rotor, whereby the potential difference between adjacent commutator segments is reduced to substantially one m-th of the maximum voltage generated by a winding element of one of said windings, and means including electrical connections any one of which is disposed entirely at one end of said winding elements for maintaining the segments at said potentials.

8. In combination, a slotted armature for dynamo electric machines a multiplex lap winding having winding elements in said slots, the ratio of the number of slots to the number of pairs of poles of said machine being an integer, and the number of winding elements per slot being prime to the number of windings, and one or more equalizing connections between points of equal potential in different windings.

9. In a dynamo-electric machine having a rotor and a commutator, a multiplex lap winding for said rotor, said winding comprising more than two independent windings having induced portions, said windings being electrically connected to said commutator, means whereby the potential difference between adjacent commutator segments is reduced to a fraction of the maximum voltage generated by a single induced portion, and means connected only to non-induced portions of said winding for maintaining the segments at said potentials.

10. In a dynamo-electric machine having a rotor and a commutator, a multiplex lap winding for said rotor, said winding comprising more than two independent windings having induced portions, said windings being electrically connected to said commutator, induced portions in the respective different windings being located in different similar polar zones to generate respectively the same potentials, and one or more electrical connections between said respective equipotential induced portions.

In testimony whereof, the signature of the inventor is affixed hereto.

WILLIAM H. POWELL.